(12) United States Patent
Mead et al.

(10) Patent No.: US 8,262,105 B2
(45) Date of Patent: Sep. 11, 2012

(54) LOCK AND RELEASE MECHANISMS FOR INTERCONNECTING DEVICES

(75) Inventors: Raymond Mead, Mt. Sterling, KY (US); Lonnie G. Craig, Georgetown, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 360 days.

(21) Appl. No.: 12/565,022

(22) Filed: Sep. 23, 2009

(65) Prior Publication Data

US 2011/0068547 A1    Mar. 24, 2011

(51) Int. Cl.
*B62B 3/14*    (2006.01)
(52) U.S. Cl. .................... 280/33.992; 224/511
(58) Field of Classification Search ............. 280/33.992, 280/33.995, 35, 47.34, 47.35; 414/360
See application file for complete search history.

(56) References Cited

U.S. PATENT DOCUMENTS

| | | | |
|---|---|---|---|
| 3,443,730 A | 5/1969 | Meusel | |
| 4,016,989 A * | 4/1977 | Furnari | 414/344 |
| 4,778,438 A * | 10/1988 | Tastavin et al. | 493/27 |
| 4,946,330 A * | 8/1990 | Pedersen et al. | 414/401 |
| 5,224,812 A | 7/1993 | Oslin et al. | |
| 5,320,475 A | 6/1994 | Pinder | |
| 5,673,834 A | 10/1997 | Cannon | |
| 5,695,315 A * | 12/1997 | Doi | 414/798.9 |
| 5,951,230 A | 9/1999 | Kruzick et al. | |
| 7,063,496 B2 | 6/2006 | Jackson et al. | |
| 2005/0012286 A1 | 1/2005 | Woodrow | |
| 2005/0084365 A1 | 4/2005 | Riordan et al. | |
| 2008/0111329 A1 | 5/2008 | Brown et al. | |
| 2008/0302585 A1 | 12/2008 | Perelli et al. | |

* cited by examiner

*Primary Examiner* — John Walters
*Assistant Examiner* — James Triggs
(74) *Attorney, Agent, or Firm* — Dinsmore & Shohl LLP

(57) ABSTRACT

A method of releasably connecting a child hand truck to a parent hand truck is provided. The method includes lifting a handle assembly to a raised position. The handle assembly is locked in the raised position using a lock and release mechanism.

17 Claims, 13 Drawing Sheets

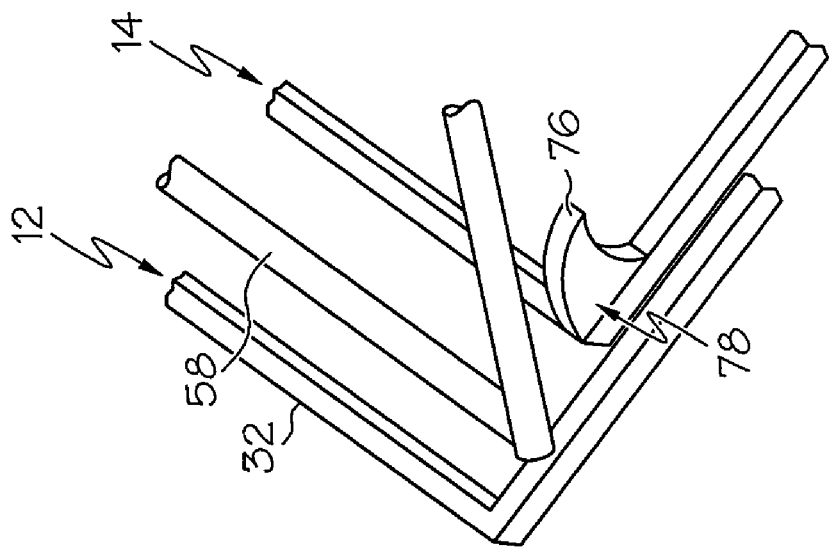
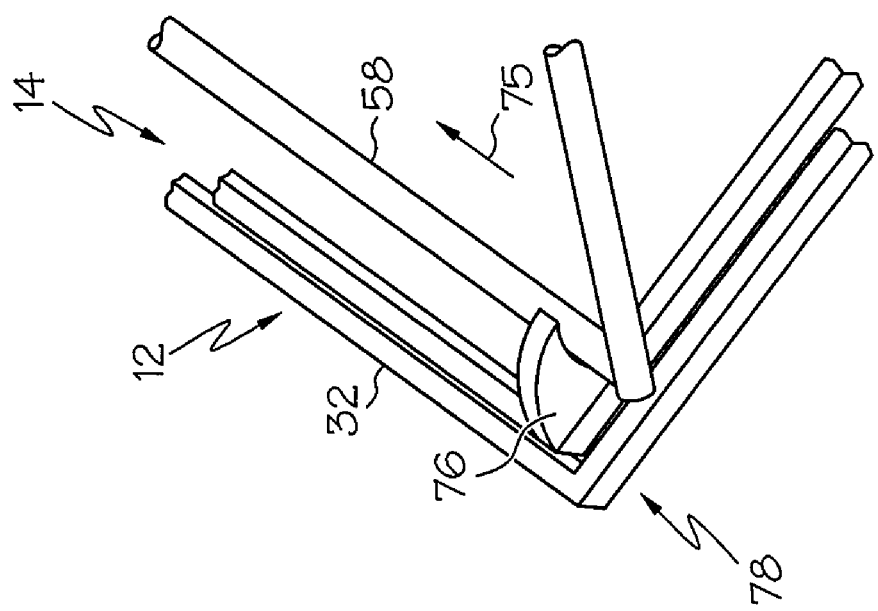

LOCK AND RELEASE MECHANISMS FOR INTERCONNECTING DEVICES

TECHNICAL FIELD

The present specification generally relates to lock and release mechanisms for interconnecting devices.

BACKGROUND

Hand trucks, sometimes referred to as dollies, come in a variety of shapes and sizes. One of the most common hand truck configurations is a generally L-shaped dolly with vertically extending handles, a base platform and wheels at opposite sides of the base platform. Objects may be seated on the base platform and lifted off the ground by tilting the handles backward toward the operator, acting as a lever. The hand truck may then be pulled or pushed around with the center of gravity of the objects over the wheels.

It is known to connect hand trucks to various other devices to help transport the hand truck. For example, a hand truck holder apparatus has been provided for releasably securing a hand truck to a vehicle bumper. However, it can be difficult or time-consuming to release such hand trucks. Accordingly, other lock and release mechanisms are desired.

SUMMARY

In one embodiment, a hand truck assembly includes a child hand truck including a locking feature. A parent hand truck includes a truck-receiving volume for receiving the child hand truck and a handle assembly configured to engage the locking feature and prevent movement of the child hand truck relative to the parent hand truck. A lock and release mechanism is configured to lock the handle assembly in a raised position and to automatically release the handle assembly as the child hand truck is removed from the truck-receiving volume.

In another embodiment, a parent hand truck that interlocks with a child hand truck includes a handle assembly including a locking bar located to engage a locking feature of the child hand truck with the handle assembly in a lowered position. The locking bar disengages the locking feature with the handle assembly in a raised position. A lock and release mechanism is configured to lock the handle assembly in the raised position.

In another embodiment, a method of releasably connecting a child hand truck to a parent hand truck is provided. The method includes lifting a handle assembly to a raised position; and locking the handle assembly in the raised position using a lock and release mechanism.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 4A and 4B illustrate operation of a handle assembly of the parent hand truck of FIG. 1 according to one or more embodiments shown and described herein;

DETAILED DESCRIPTION

Embodiments described herein relate to lock and release mechanisms for interlocking hand trucks. The lock and release mechanisms generally include a linkage that allows an operator to lock a release handle in an unlatch position while one hand truck (a child hand truck) is released from a different hand truck (a parent hand truck) without any need to maintain a hold on the release handle. This provides an operator with freedom to use both hands to remove the child hand truck from the parent hand truck. Various embodiments of the lock and release mechanisms and the operation of the lock and release mechanisms will be described in more detail herein.

Figure 1:
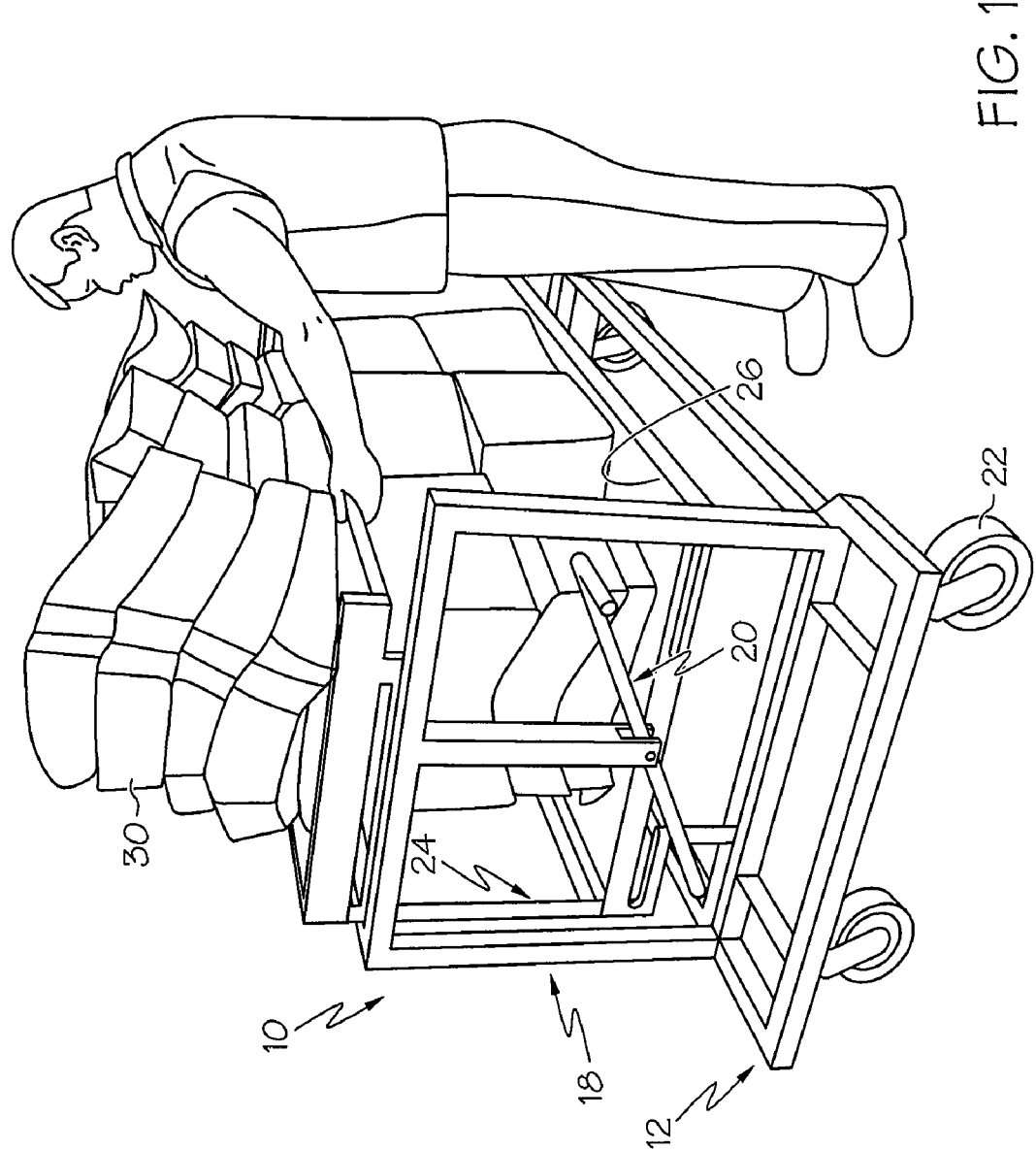
FIG. 1 is a perspective view of a hand truck assembly according to one or more embodiments shown and described herein.

Referring to FIG. 1, a hand truck assembly 10 includes a parent hand truck 12 and a child hand truck 14 that is releasably coupled to the parent hand truck 12. The parent hand truck 12 may include coupling structure (not shown) that is used to couple a series of hand truck assemblies 10 together in a train, for example, for transporting the multiple hand truck assemblies 10 together. The hand truck assemblies 10 may be moved manually or using some form of powered assist that includes a driver and a mechanism for coupling to the hand truck assemblies 10.

Figure 2:
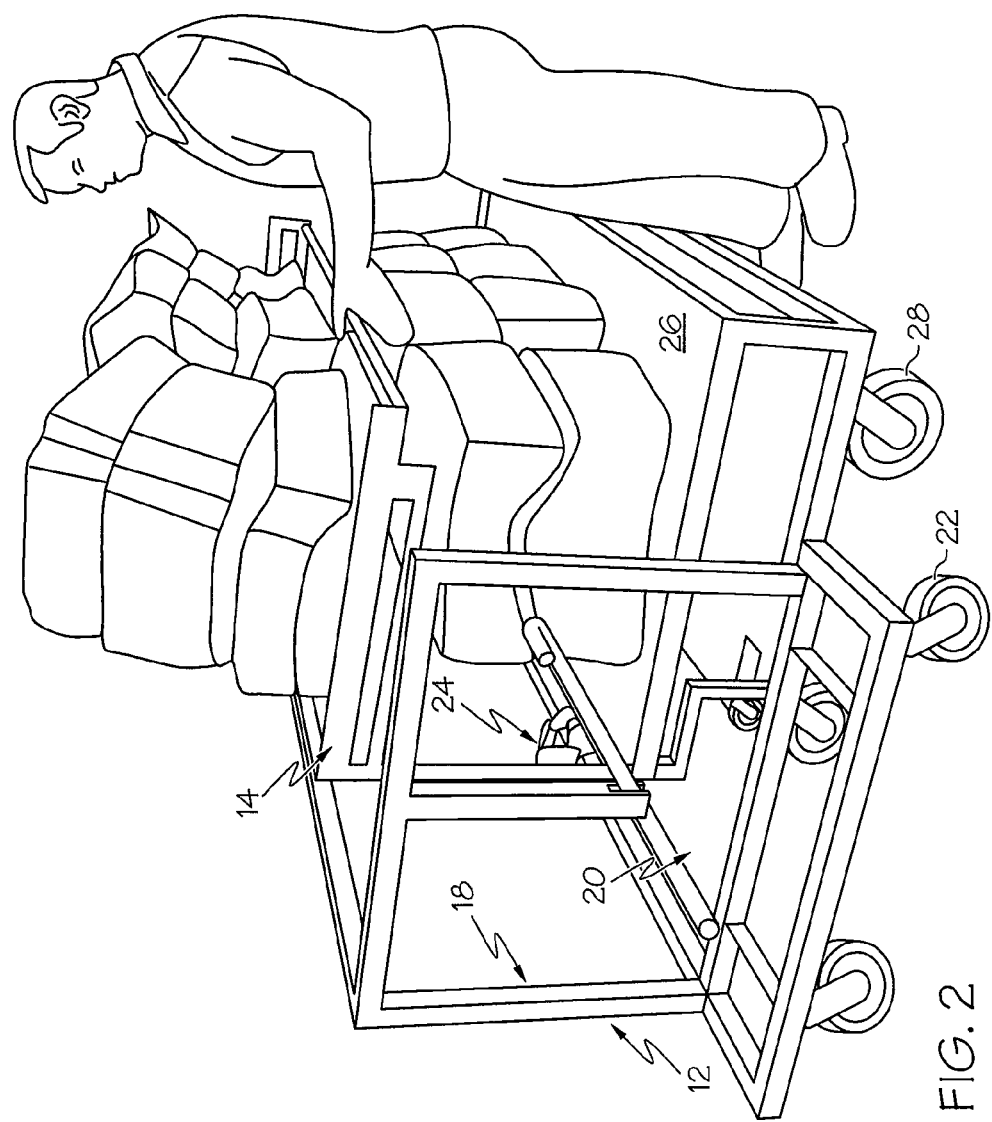
FIG. 2 is a perspective view of the hand truck assembly of FIG. 1 with the child hand truck being removed from the parent hand truck according to one or more embodiments shown and described herein.

Referring also to FIG. 2 showing the child hand truck 14 being released from the parent hand truck 12, the parent hand truck 12 generally includes a support frame 18 that surrounds at least part of the child hand truck 14. Wheels 22 are provided at the bottom of the support frame 18 to facilitate movement of the parent hand truck 12. A release handle assembly 20 is provided on the parent hand truck 12. The release handle assembly 20 is used to lock and unlock the child hand truck 14 from the parent hand truck 12. The child hand truck 14 generally includes a support frame 24 that supports a load-carrying platform 26. Wheels 28 may be provided at the bottom of the frame 24 to facilitate movement of the child hand truck 14. Objects 30, such as automotive parts for an assembly line, may be supported by the load-carrying platform 26.

Figure 3:
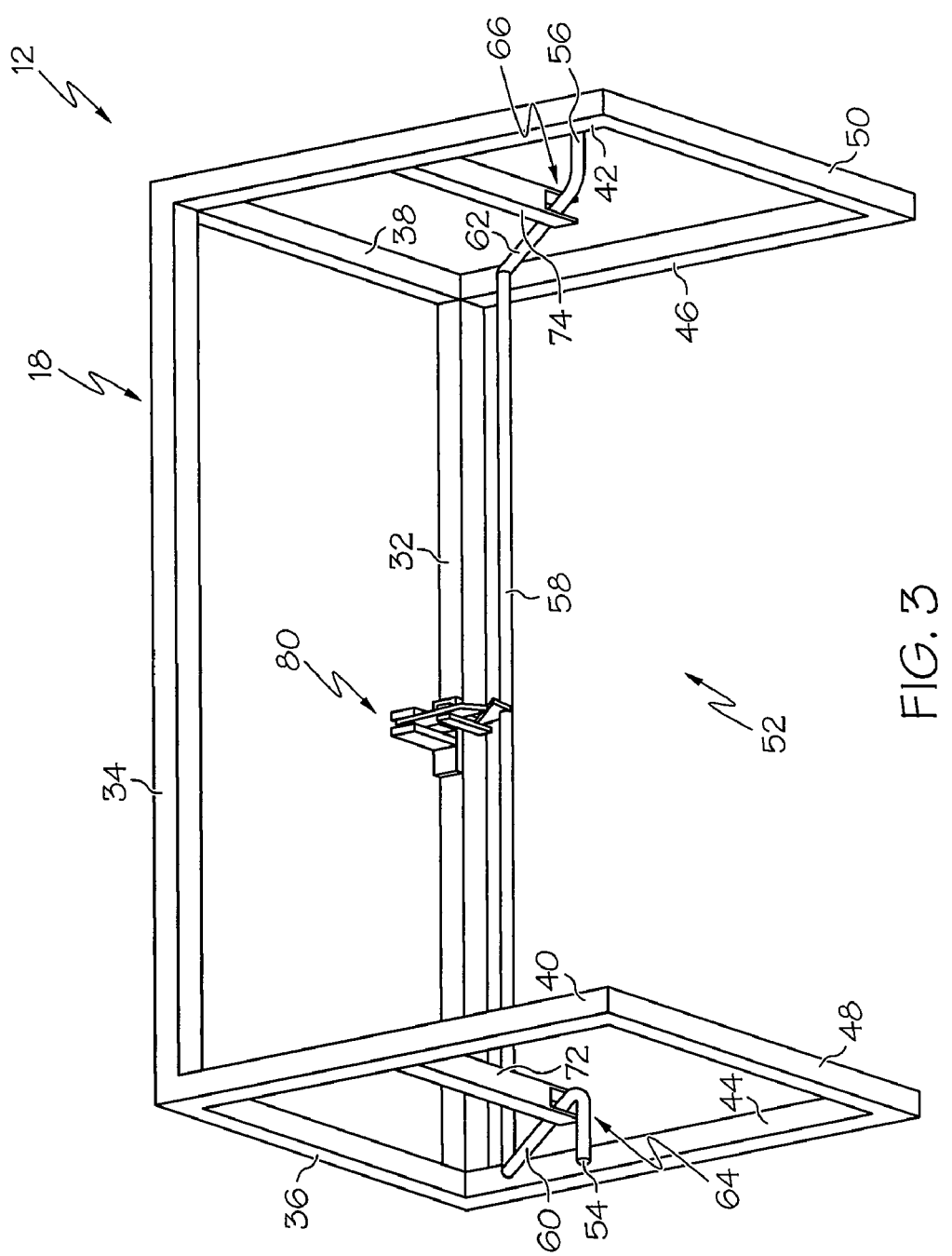
FIG. 3 is a perspective view of the parent hand truck of FIG. 1 shown in isolation according to one or more embodiments shown and described herein.

FIG. 3 illustrates the parent hand truck 12 in isolation. The parent hand truck 12 includes the support frame 18 that generally includes a bottom front cross bar 32 and a top front cross bar 34. Vertical side bars 36 and 38 extend vertically between the bottom front cross bar 32 and the top front cross bar 34. Side top bars 40 and 42 extend rearward from the top front cross bar 34 and side bottom bars 44 and 46 extend rearward from the bottom front cross bar 32. Vertical side bars 48 and 50 extend vertically between the side top bars 40, 42 and the side bottom bars 44, 46. The support frame 18 forms a somewhat U-shaped receiving volume 52 that is sized to receive the child hand truck 14.

The release handle assembly 20 includes handle portions 54 and 56 at opposite sides of the support frame 18 that are connected to locking bar 58 by side linkages 60 and 62. The side linkages 60 and 62 are each slidingly received within a guide opening 64 and 66 provided at an end of a support beam 72 and 74 that hangs down from a respective side top bar 40 and 42. The release handle assembly 20 has a raised unlock position where the locking bar 58 is in a vertical, lifted position and a lowered lock position where the locking bar 58 is in the lowered position as shown by FIG. 3. In some embodiments, the locking bar 58 may rest on the side bottom bars 44 and 46 in the lowered position.

FIGS. 4A and 4B illustrate operation of the locking bar 58. The child hand truck 14 may include locking features (only locking feature 76 can be seen) that can be used to lock the child hand truck 14 and parent hand truck 12 together. Another locking feature may be located at an opposite outer corner of the child hand truck 14. In this embodiment, the child hand truck 14 includes the locking features 76 at an outer corner 78 of the support frame 24. The locking features 76 are somewhat hook-shaped and are sized to fit between the locking bar 58 and the bottom front cross bar 32 of the parent hand truck 12. As can be seen by FIG. 4A, the locking bar 58 can engage the locking features 76 with the release handle assembly 20 in the lowered position to prevent release of the child hand truck 14 from the parent hand truck 12. When the release handle assembly 20 is raised (represented by arrow 75) to the lifted position, the locking features 76 are released and the child hand truck 14 can be moved away from the parent hand truck 12 as illustrated by FIG. 4B.

Figure 5:
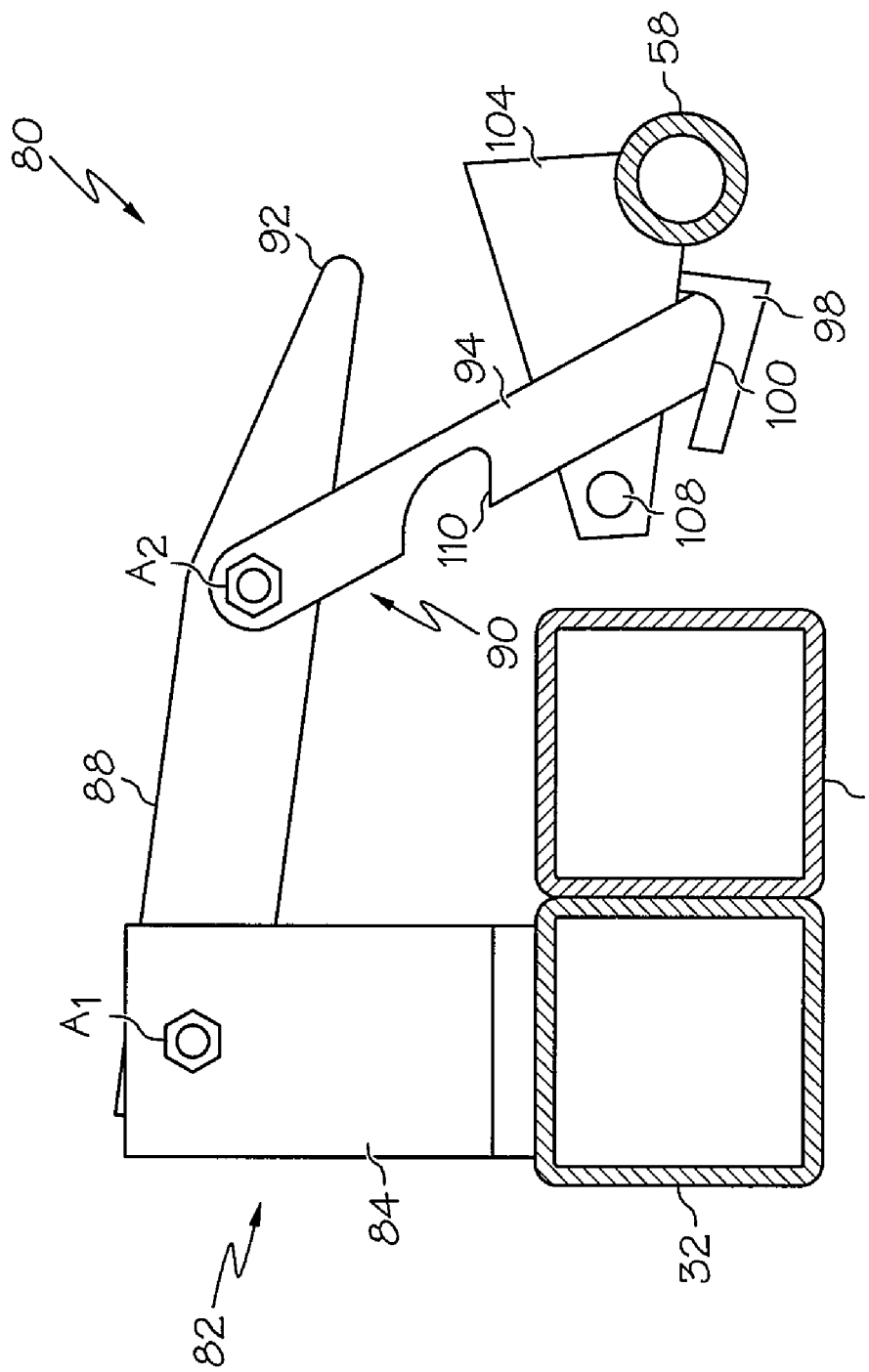
FIG. 5 is a section view of the hand truck assembly showing a latch and release mechanism according to one or more embodiments shown and described herein.
Figure 6:
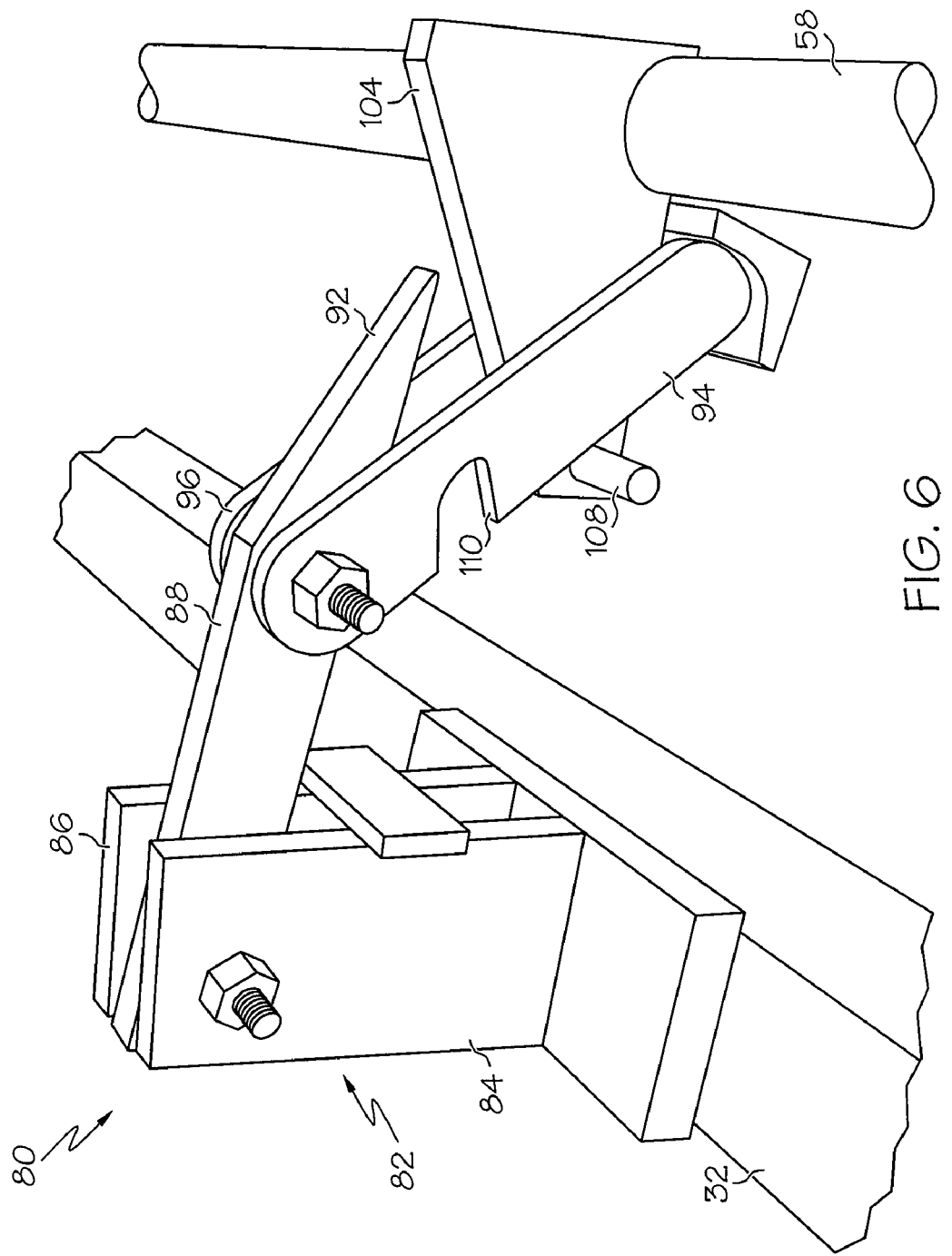
FIG. 6 is a perspective view of the hand truck assembly of FIG. 5 according to one or more embodiments shown and described herein.

As indicated above and referring to FIGS. 5 and 6, a lock and release mechanism 80 may be provided that is used to lock the release handle assembly 20 in the lifted position so that the operator can remove the child hand truck 14 from the parent hand truck 12 without holding the release handle assembly 20 manually in the lifted position. The lock and release mechanism 80 includes a mounting bracket 82 that may be formed of a pair of L-shaped bracket members 84 and 86. The bracket members 84 and 86 may be fixedly mounted to the bottom front cross bar 32 by any suitable connection, such as fasteners and/or welding. An arm 88 is rotatably mounted to the mounting bracket 82, between the bracket members 84 and 86. The arm 88 may pivot about an axis $A_1$. A latch assembly 90 is rotatably mounted to the arm 88 at a location proximate of an end 92 of the arm. The latch assembly 90 may be formed by a pair of latch rods 94 and 96 that are rotatably mounted to the arm 88 at axis $A_2$. A cam member 98 is located at the ends 100 and 102 of the latch rods 94 and 96 forming a closed loop. A bar latch plate 104 is fixedly mounted to the locking bar 58. The bar latch plate 104 has a nose portion 106 that extends outwardly from the locking bar 58 and is received through the closed loop of the latch assembly 90. A latch member 108 (e.g., bar-like projections) extend horizontally from opposite sides of the bar latch plate 104 on a side of the latch assembly 90 facing away from the locking bar 58. In some embodiments, the latch member 108 has a length that is greater than a width of the closed loop (between the latch rods 94 and 96 to prevent the bar latch plate 104 from being pulled out of the closed loop. The latch member 108 may be sized to be received with latch notches (only latch notch 110 can be seen) or other latch features formed in both the latch rods 94 and 96.

Figure 7:
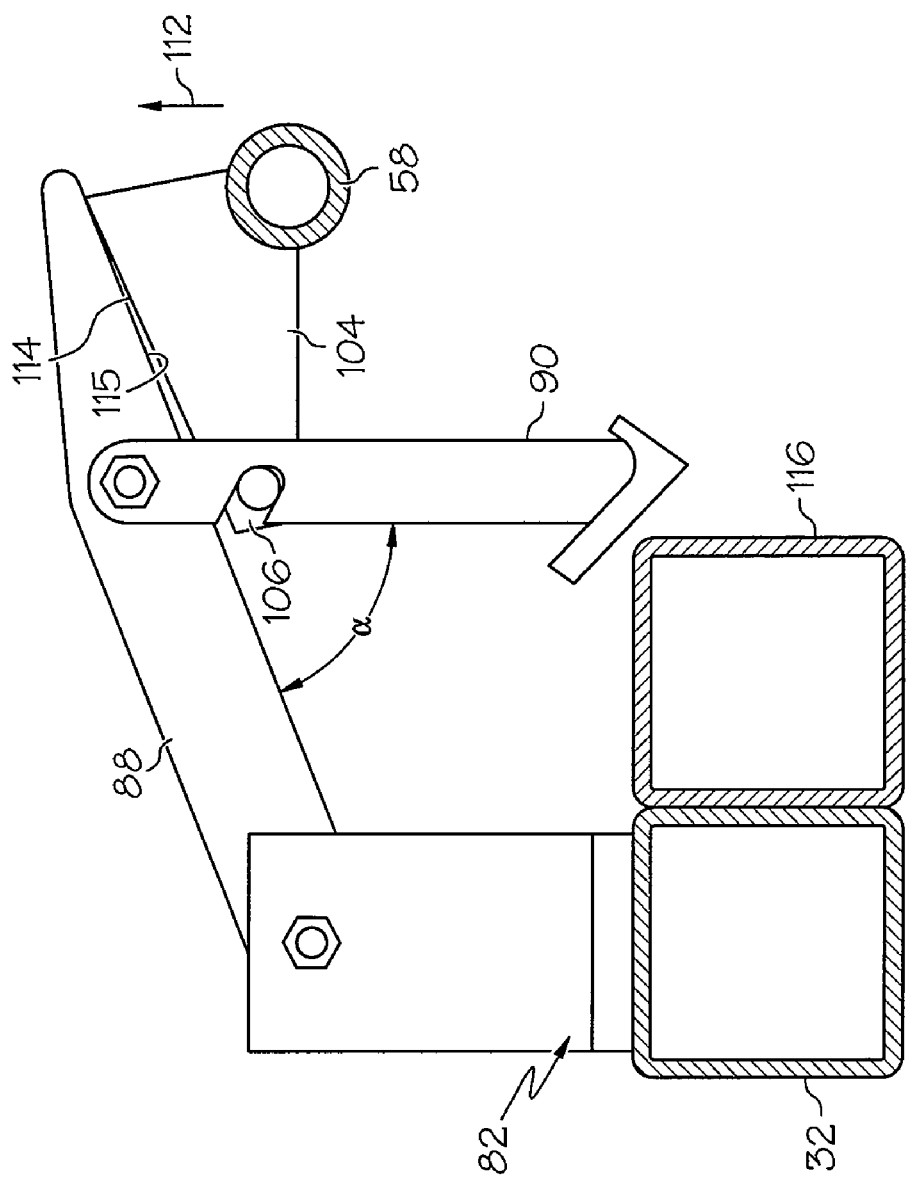
FIG. 7 is a section view of the latch and release mechanism of FIG. 5 locked in the raised position according to one or more embodiments shown and described herein.

Referring also to FIG. 7, when the operator lifts the release handle assembly 20, the locking bar 58 raises in the direction of arrow 112. Due to the fixed connection between the bar latch plate 104 and the locking bar 58, the bar latch plate 104 lifts with the locking bar 58 causing the nose portion 106 of the bar latch plate 104 to slide vertically along a length of the closed loop formed by the latch assembly 90. An upper end surface 114 of the bar latch plate 104 then contacts a lower end surface 115 of the arm 88, causing the arm 88 to lift. When the latch member 108 aligns with the latch notches 110, the arm 88 rotates forward such that the latch member 108 is received within the latch notches 110 as shown by FIG. 7. As seen, an angle $\alpha$ between the arm 88 and the latch assembly 90 decreases (from the lowered position) such that the latch assembly 90 is in a vertical orientation when the latch member 108 is received by latch notches 110. In the position of FIG. 7, the handle assembly 20 is locked in the lifted position so that the child hand truck 14 can be separated from the parent hand truck 12.

Figure 8:
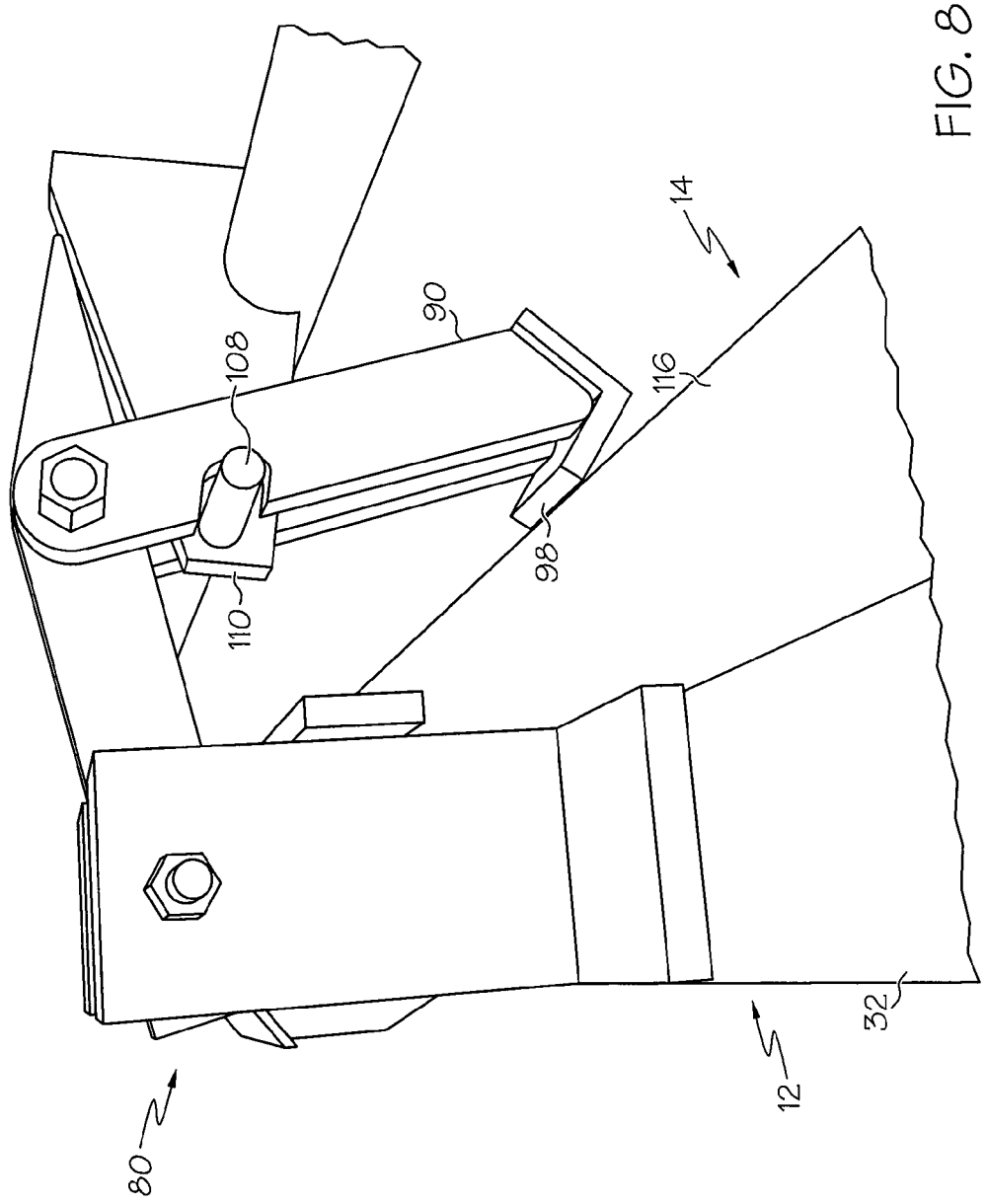
FIG. 8 is a perspective view illustrating removal of the child hand truck with the handle assembly in the raised position according to one or more embodiments shown and described herein.
Figure 9:
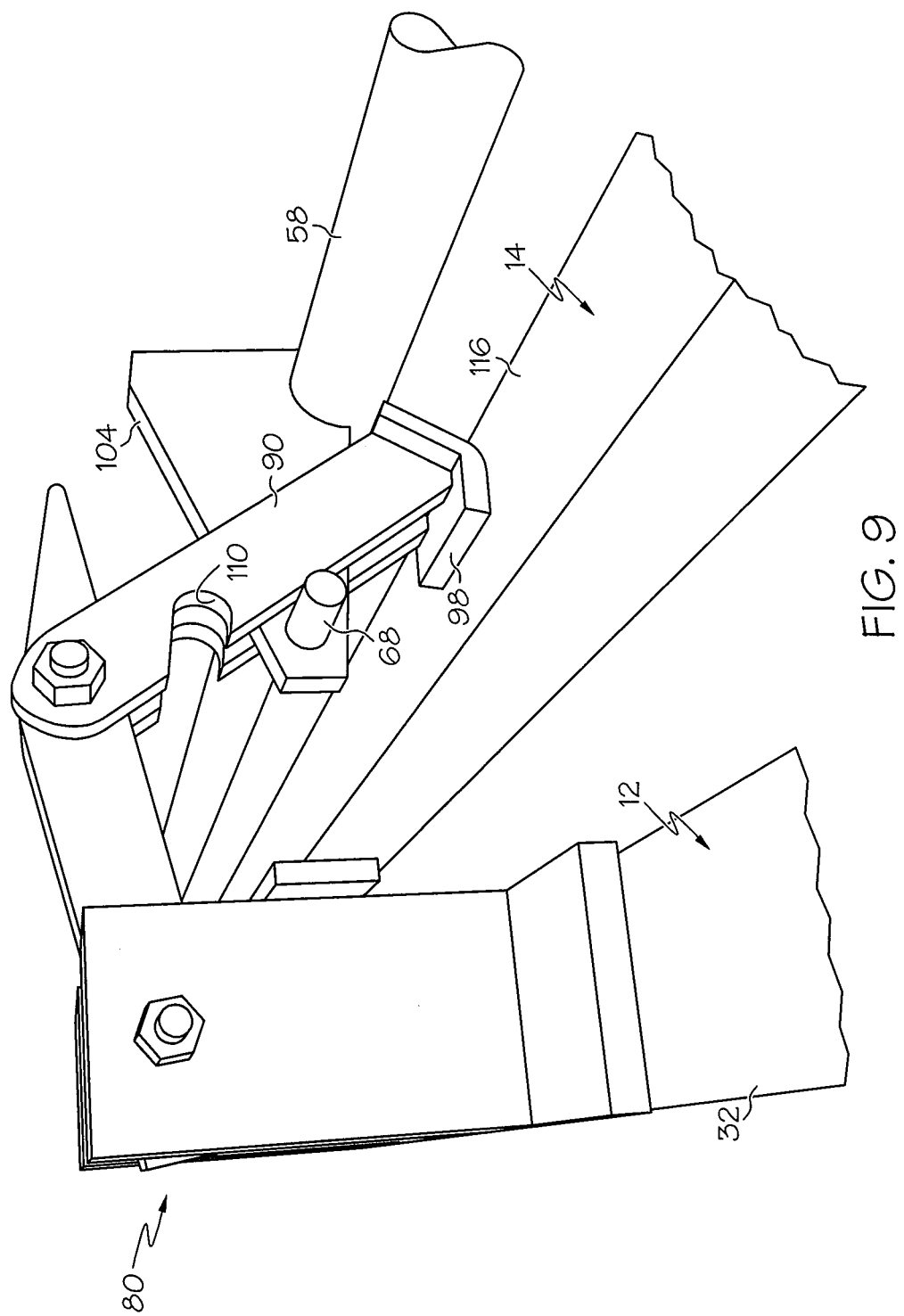
FIG. 9 is a perspective view illustrating removal of the child hand truck with the handle assembly being automatically released from the raised position according to one or more embodiments shown and described herein.
Figure 10:
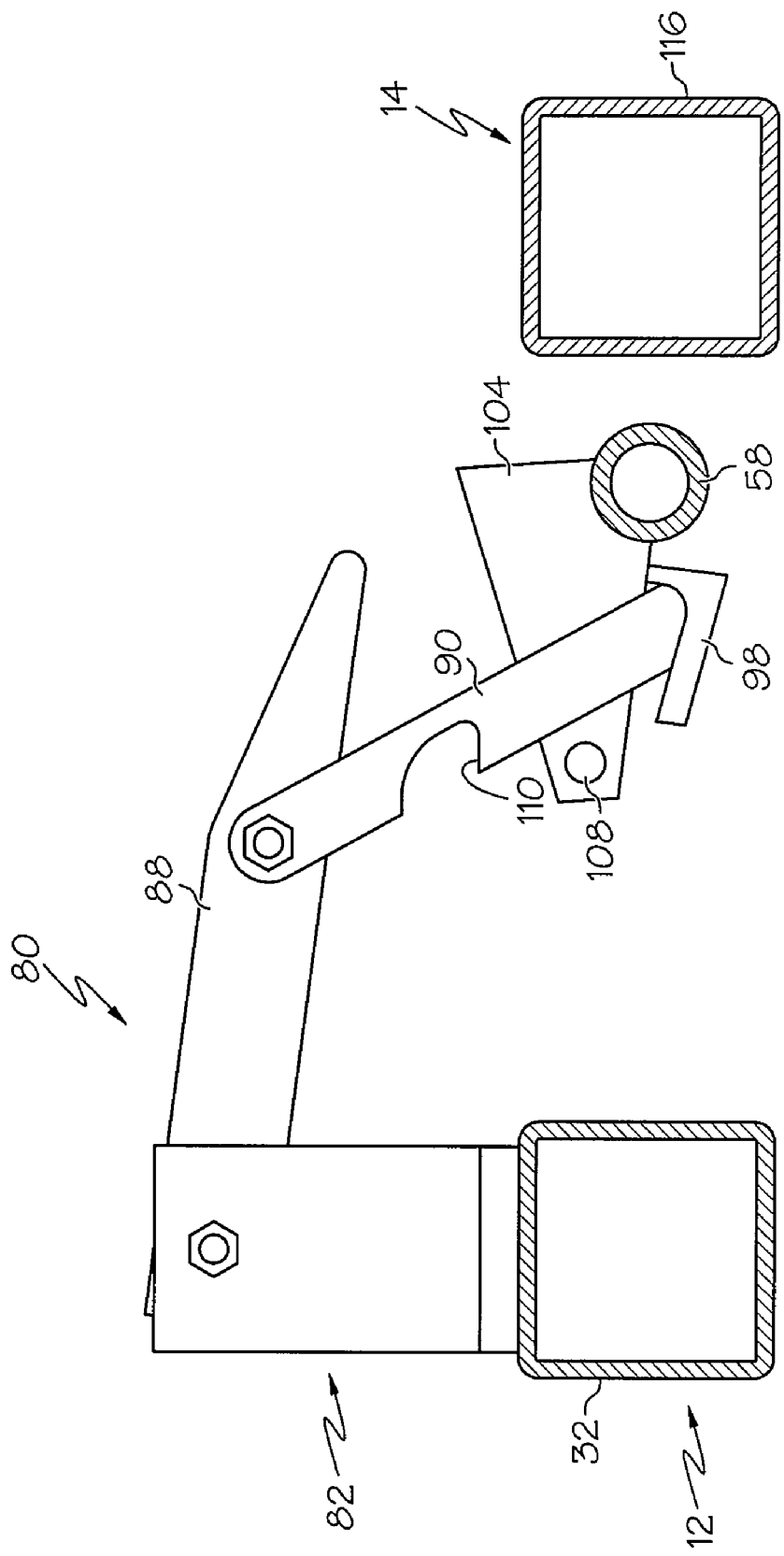
FIG. 10 is a section view illustrating the latch and release mechanism disengaged and the handle assembly in the lowered position once the child hand truck is separated from the parent hand truck according to one or more embodiments shown and described herein.

Referring now to FIGS. 8 and 9, as a bottom front cross bar 116 of the child hand truck 14 is moved away from the bottom front cross bar 32 of the parent hand truck 12, the bottom front cross bar 116 of the child hand truck 14 comes into contact with the cam member 98. The shape of the cam member 98 is such that the latch assembly 90 lifts and rotates as the bottom front cross bar 116 is pulled thereby, forcing the latch member 108 out of the latch notches 110. Referring to FIG. 10, once the bottom front cross bar 116 is pulled past the cam member 98, the lock and release mechanism 80 is automatically unlocked and the release handle assembly 20 is in the lowered position.

Figure 11:
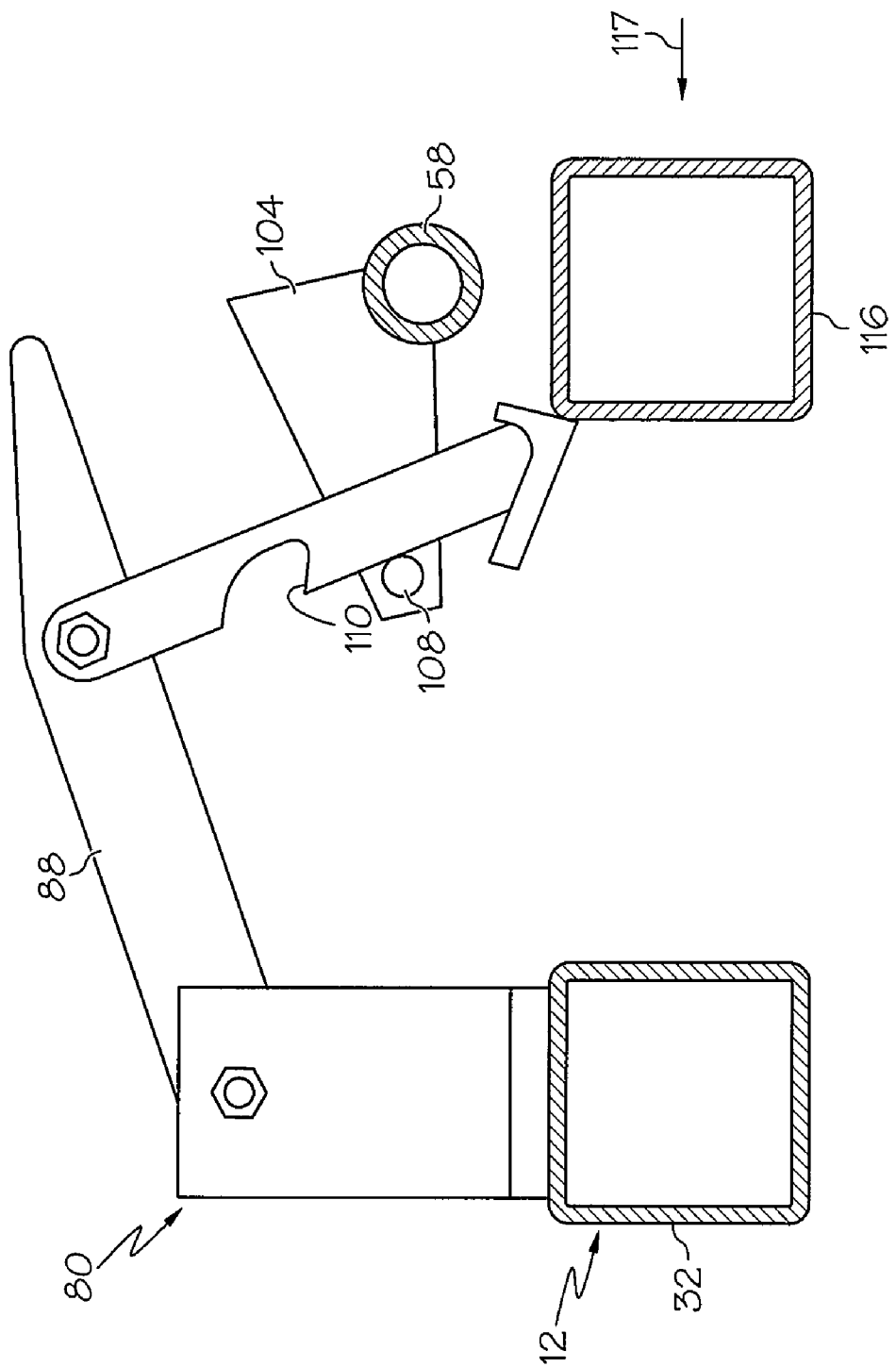
FIG. 11 is a section view illustrating the child hand truck being coupled to the parent hand truck according to one or more embodiments shown and described herein.
Figure 12:
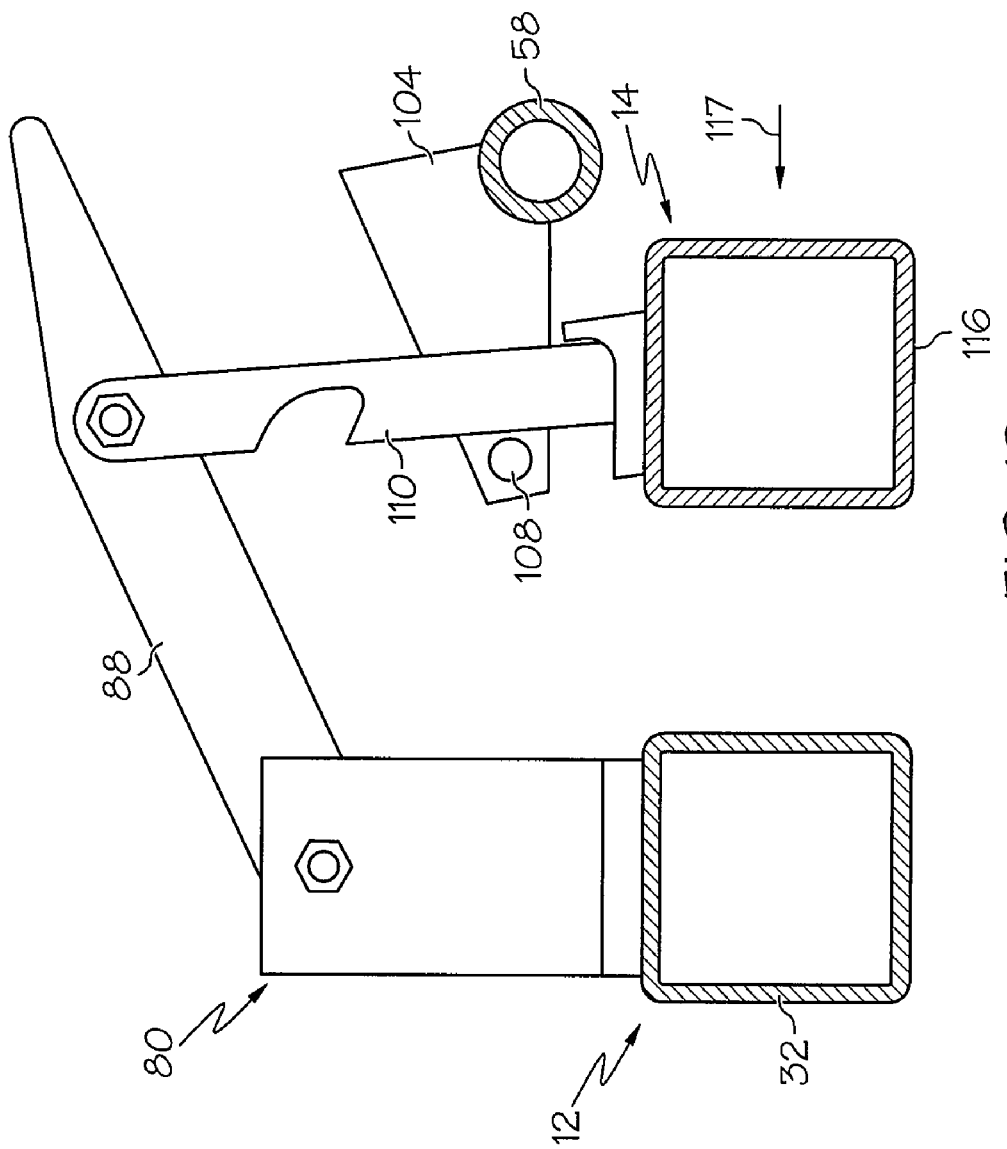
FIG. 12 is another section view illustrating the child hand truck being coupled to the parent hand truck according to one or more embodiments shown and described herein.

Referring to FIGS. 11 and 12, the lock and release mechanism 80 can be used to raise the handle assembly 20 itself, without manually raising the handle assembly 20. As the child hand truck 14 is reintroduced to the parent hand truck 12 by pushing the child hand truck into the receiving volume 52 in the direction of arrow 117, the bottom front cross bar 116 of the child hand truck 14 contacts the lock and release mechanism 80 causing the lock and release mechanism 80 including the locking bar 58 to raise automatically. The lock and release mechanism 80 is raised such an amount so that the locking bar 58 can clear the locking features 76, yet not enough to place the latch member 108 in the latch notches 110. In other words, introducing the child hand truck 14 to the parent hand truck 12 in this fashion connects the child hand truck 14 to the parent hand truck 12 as seen in FIG. 5 without locking the lock and release mechanism 80 in the raised position.

Figure 13:
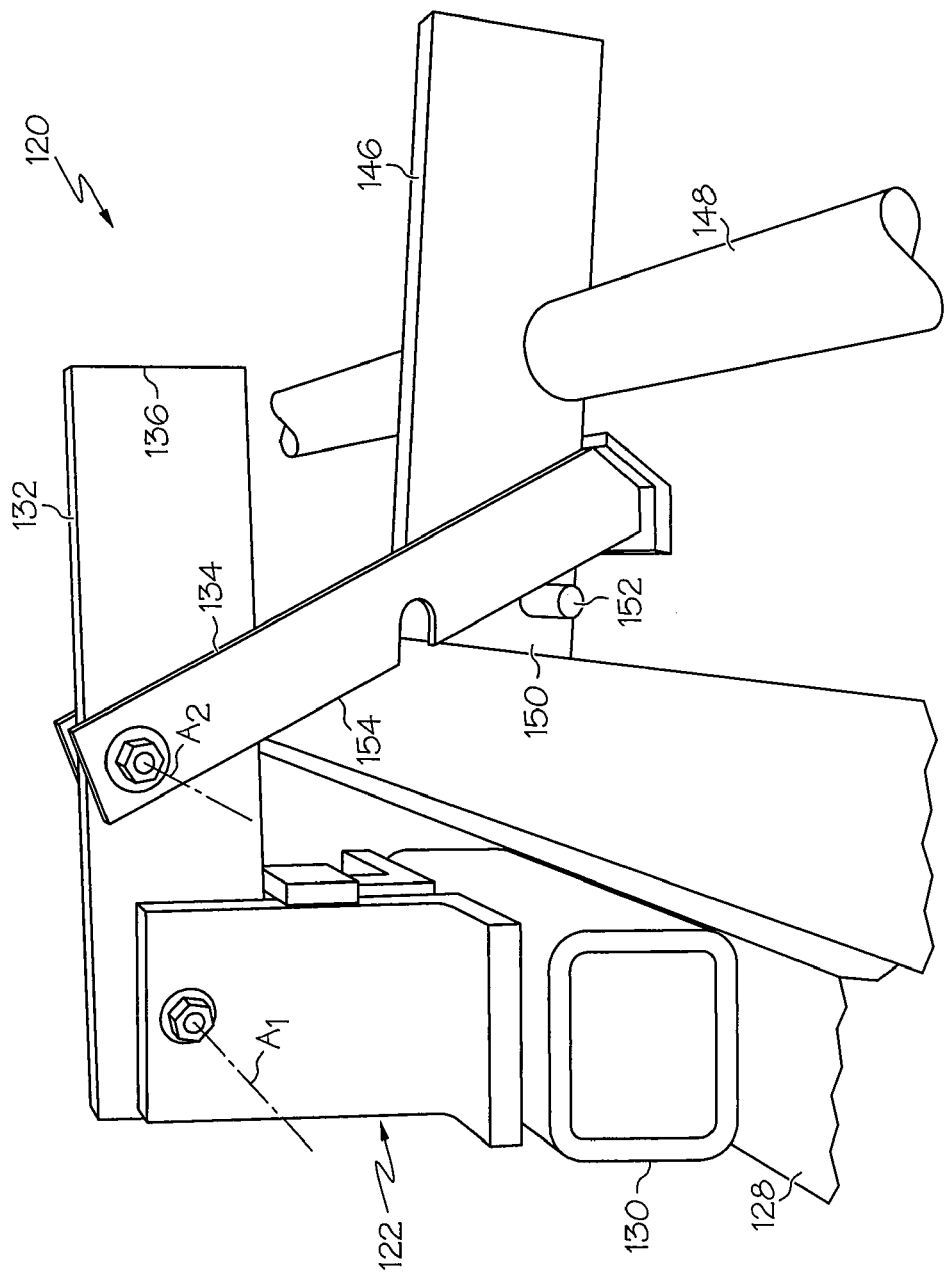
FIG. 13 illustrates another embodiment of a latch and release mechanism according to one or more embodiments shown and described herein.

Referring now to FIG. 13, another embodiment of a lock and release mechanism 120 includes many of the features discussed above including a mounting bracket 122 that may be formed of a pair of L-shaped bracket members. The mounting bracket 122 may be fixedly mounted to a bottom front cross bar 128 by any suitable connection, such as fasteners and/or welding. In this embodiment, the mounting bracket 122 is indirectly mounted to the bottom front cross bar 128 using an intermediate mounting member 130. An arm 132 is rotatably mounted to the mounting bracket 122, between the bracket members 124 and 126. The arm 132 may pivot about an axis $A_1$. A latch assembly 134 is rotatably mounted to the arm 132 at a location proximate of an end 136 of the arm. The latch assembly 134 may be formed by a pair of latch rods that are rotatably mounted to the arm 132 at axis $A_2$. Ends of the latch rods may be connected forming a closed loop. A bar latch plate 146 is fixedly mounted to a locking bar 148. The bar latch plate 146 has a nose portion 150 that extends outwardly from the locking bar 148 and is received through the closed loop of the latch assembly 134. A latch member 152 (e.g., bar-like projections) extend horizontally from opposite sides of the bar latch plate 146 on a side of the latch assembly 134 facing away from the locking bar 148. In some embodiments, the latch member 152 has a length that is greater than a width of the closed loop (between the latch rods 138 and 140 to prevent the bar latch plate 146 from being pulled out of the closed loop. The latch member 152 may be sized to be received with latch notches (only latch notch 154 can be seen) formed in both the latch rods 138 and 140. Operation of the lock and release mechanism 120 can be similar to operation of the lock and release mechanism 80.

The lock and release mechanisms described herein generally include a linkage that allows an operator to lock a release handle in an unlatch position while the child hand truck is released from the parent hand truck without any need to maintain a hold on the release handle. This provides an operator with freedom to use both hands to remove the child hand truck from the parent hand truck. The lock and release mechanisms are automatically released as the child hand truck is removed from the parent hand truck. While parent and child hand trucks are described herein, the lock and release mechanisms may be used with other interconnecting devices.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A hand truck assembly, comprising:
a child hand truck comprising a locking feature;
a parent hand truck including a truck-receiving volume for receiving the child hand truck, a bottom front cross bar, and a handle assembly configured to engage the locking feature and prevent movement of the child hand truck relative to the parent hand truck, the handle assembly including a locking bar that engages the locking feature of the child hand truck; and
a lock and release mechanism configured to lock the handle assembly in a raised position and to automatically release the handle assembly as the child hand truck is removed from the truck-receiving volume, the lock and release mechanism comprising:
a mounting bracket fixedly mounted to the bottom from cross bar of the parent hand truck;
an arm pivotally mounted to the mounting bracket;
a latch assembly pivotally mounted to the arm, the latch assembly forming a closed loop; and
a bar latch plate mounted to the locking bar, the bar latch plate including a nose portion slidingly received within the closed loop.

2. The hand truck assembly of claim 1, wherein the lock and release mechanism is mounted to the bottom front cross bar.

3. The hand truck assembly of claim 1, wherein the bar latch plate includes a latch member configured to interlock with a latch feature of the latch assembly.

4. The hand truck assembly of claim 3, wherein the latch member comprises a projection extending outwardly from a side of the bar latch plate at the nose portion and the latch feature comprises a notch formed in the latch assembly sized to receive the projection.

5. The hand truck assembly of claim 4, wherein lifting the handle assembly from a lowered position locates the projection within the notch thereby locking the handle assembly in the raised position with the locking bar out-of-engagement with the locking feature.

6. The hand truck assembly of claim 5, wherein the latch assembly comprises a cam member located at an end of the latch assembly.

7. The hand truck assembly of claim 6, wherein the cam member is located to engage a bottom cross bar of the child hand truck assembly with the handle assembly in the raised position, the cam assembly including a cam surface shaped such that the latch assembly lifts from the raised position as the bottom cross bar of the child hand truck assembly is removed from the parent hand truck assembly thereby forcing the projection from the notch.

8. The hand truck assembly of claim 1, wherein the latch assembly is pivotally mounted to the arm at a location proximate an end of the arm.

9. A parent hand truck for interlocking with a child hand truck, the parent hand truck comprising:
a handle assembly comprising a locking bar located to engage a locking feature of the child hand truck with the handle assembly in a lowered position, the locking bar disengaging the locking feature with the handle assembly in a raised position;
a bottom front cross bar; and
a lock and release mechanism configured to lock the handle assembly in the raised position, the lock and release mechanism comprising:
a mounting bracket fixedly mounted to the bottom front cross bar of the parent hand truck;
an arm pivotally mounted to the mounting bracket;
a latch assembly pivotally mounted to the arm, the latch assembly forming a closed loop; and a bar latch plate mounted to the locking bar, the bar latch plate including a nose portion slidingly received within the closed loop.

10. The parent hand truck of claim 9 wherein the lock and release mechanism is mounted to the bottom front cross bar.

11. The parent hand truck of claim 9, wherein the bar latch plate includes a latch member configured to interlock with a latch feature of the latch assembly.

12. The parent hand truck of claim 11, wherein the latch member comprises a projection extending outwardly from a side of the bar latch plate at the nose portion and the latch feature comprises a notch formed in the latch assembly sized to receive the projection.

13. The parent hand truck of claim 12, wherein lifting the handle assembly from a lowered position locates the projection within the notch thereby locking the handle assembly in the raised position.

14. The parent hand truck of claim 13, wherein the latch assembly comprises a cam member located at an end of the latch assembly.

15. The parent hand truck of claim 14, wherein the cam member is located to engage a bottom cross bar of the child hand truck assembly with the handle assembly in the raised position, the cam assembly including a cam surface shaped such that the latch assembly lifts from the raised position as the bottom cross bar of the child hand truck assembly is removed from the parent hand truck assembly thereby forcing the projection from the notch.

16. A method of releasably connecting a child hand truck to a parent hand truck, the method comprising:
lifting a handle assembly to a raised position such that a locking bar on the handle assembly engages a locking feature of the child hand truck and prevents movement of the child hand truck relative the parent hand truck; and
locking the handle assembly in the raised position by slidingly receiving a nose portion of a bar latch plate mounted to the locking bar within a closed loop formed by a latch assembly fixedly mounted to the parent hand truck.

17. The method of claim 16 further comprising automatically releasing the handle assembly as the child hand truck is removed from the parent hand truck.

* * * * *